United States Patent [19]
Kamiya et al.

[11] Patent Number: 6,103,390
[45] Date of Patent: *Aug. 15, 2000

[54] DECORATIVE ARTICLE AND DECORATIVE LAMINATE

[75] Inventors: Tatsushi Kamiya; Hachiro Ohnishi; Miyuki Ogasawara; Masahito Hoshino; Yasuyuki Ohara, all of Nagoya, Japan

[73] Assignee: Tsuchiya Co., Ltd., Aichiken-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/026,653

[22] Filed: Feb. 20, 1998

[30] Foreign Application Priority Data

Aug. 7, 1997 [JP] Japan .................................. 9-213537

[51] Int. Cl.⁷ .................................................. A47G 35/00
[52] U.S. Cl. ........................ 428/542.2; 428/76; 428/161; 428/195; 428/205; 428/424.4; 428/424.8; 428/425.8; 428/458; 428/463; 428/480; 264/132; 264/134; 264/163; 264/247; 156/231; 156/240

[58] Field of Search ............................... 428/161, 76, 182, 428/201, 914, 213, 458, 463, 424.4, 142, 424.8, 542.2, 425.8, 31, 520, 522, 480, 910, 195, 215, 328, 187; 156/231, 233, 240, 267, 655.1, 656; 264/163, 132, 134, 243, 247; 427/250, 296

[56] References Cited

U.S. PATENT DOCUMENTS

| | | | |
|---|---|---|---|
| 4,268,570 | 5/1981 | Imanaka et al. | 428/216 |
| 4,431,711 | 2/1984 | Eisfeller | 428/31 |
| 4,713,143 | 12/1987 | Eisfeller | 156/655 |
| 5,143,672 | 9/1992 | Kuwahara | 264/132 |
| 5,589,022 | 12/1996 | Kuwahara | 156/231 |

*Primary Examiner*—Deborah Jones
*Assistant Examiner*—Abraham Bahta
*Attorney, Agent, or Firm*—Dennison, Scheiner, Schultz & Wakeman

[57] ABSTRACT

A decorative article including a base layer essentially consisting of a resin sheet and a decorative layer attached to the base layer and essentially consisting of a resin film and a metal thin film formed on a lower surface of the resin film. The metal thin film is formed in a microscopically discontinuous pattern.

22 Claims, 4 Drawing Sheets

DECORATIVE ARTICLE AND DECORATIVE LAMINATE

BACKGROUND OF THE INVENTION

1. Field of the Invention

The present invention relates to a decorative article, such as an emblem and an ornament for an automobile, and further relates to the decorative laminate suitable for manufacturing the decorative article.

2. Description of the Related Art

Examples of conventional decorative articles are (1)an emblem which is constructed from a die casting substrate, and a chromium thin film applied on the substrate by plating; (2)an emblem which is constructed from a molding substrate of a rigid plastic material such as ABS formed by injection molding, and a thin film of nickel, chromium and other metals formed on the substrate by plating; and (3)an emblem which is constructed from a molding substrate of an elastomer such as polyurethane formed by injection molding, and a thin film of a chromium—tin—copper alloy formed on the substrate by vacuum evaporating. (The last emblem is shown, for example, in Japanese Patent Publication No. 53-40229.)

However, the first two emblems of the conventional emblems as described above each exhibit less elasticity because of its rigidity. Therefore, such emblems can not be sufficiently flexed so as to conform to many types of mounting objects having different configurations and curvatures. As a result, each of these emblems must be specially designed for particular mounting objects. In other words, each of these emblems can not be used for different types of mounting objects without changing the design thereof. This may lead to increased manufacturing costs of the emblems.

The last emblem of the conventional emblems as described above exhibits relatively increased elasticity. However, the elasticity of the emblem is still insufficient to adequately conform to many types of mounting objects having different configurations and curvatures. Also, when such an emblem is intended to be mounted on a mounting object having large curvature, a double-sided tape having strong adhesion must be used to reliably secure the emblem. Additionally, when the emblem is mounted on such a mounting object having a large curvature, it tends to produce cracks therein. Thus, such an emblem is not a fully acceptable product either.

A fourth type of decorative article is produced by stamping a decorative laminate which is constructed from a thermoplastic synthetic resin substrate sheet and a thermoplastic synthetic resin film layered on the substrate sheet, in which the resin film is covered with a metal thin film of aluminum, silver, copper, nickel, chromium, titanium, gold and other metals, which is formed on the lower surface thereof by evaporating. However, in such a decorative article, when it is mounted on a mounting object having a large curvature, cracks may be formed in the metal thin film since the resin film is stretched, thereby damaging the metal thin film therein. This damage results, because the metal thin film is continuously formed on the resin film. As a result, the decorative article may have an undesirable awkward appearance resulting from such cracks.

Additionally, when such a decorative article is mounted on the mounting object and is then exposed to the environment, the metal thin film may suffer from corrosion. The corrosion can steadily progress to deteriorate the metal thin film within a short period of time. Again, this damage results, because the metal thin film is continuously formed on the film. This may lead to an undesirable awkward appearance of the decorative article.

SUMMARY OF THE INVENTION

It is an object of the present invention to provide a decorative article in which the problems associated with the conventional decorative body are reduced or eliminated.

It is another object of the present invention to provide a decorative article which may exhibit sufficient flexibility or elasticity so as to be adaptable to many types of mounting objects having different configurations and curvatures without changing the design thereof, and which do not produce an undesirable awkward appearance therein when it is mounted on the mounting object.

It is a further object of the present invention to provide a decorative article which may maintain the original appearance for a long period of time.

It is still a further object of the present invention to provide a decorative laminate which is suitable for manufacturing the decorative article described above.

In order to attain the present objects, the present invention provides a decorative article including a base layer essentially consisting of a resin sheet, and a decorative layer attached to the base layer which essentially consists of a resin film and a metal thin film formed on a lower surface of the resin film. The metal thin film is formed in a microscopically discontinuous pattern.

For decorative articles produced according to the teachings herein, since the metal thin film is formed in a microscopically discontinuous pattern, the metal thin film does not produce cracks if the resin film on which it is formed is stretched. Additionally, if the metal thin film begins to corrode, the corrosion may be effectively interrupted by the separation between metal particles in the discontinuous pattern. Therefore, the decorative article may be mounted on many types of mounting objects having different configurations and curvatures without injuring the appearance thereof, and may maintain the original appearance for a long period of time.

Further, the microscopically discontinuous pattern preferably may be a multi-dot pattern. The metal thin film preferably may be made of tin or indium.

The metal thin film also may be provided with an optional protection coating thereon to protect the metal thin film.

Moreover, the resin film may be applied with a coloring coating thereon for printing graphics. Also, the resin film may be applied with a clear coating thereon for protection purposes.

Other objects and features of the invention will be more fully understood from the following detailed description and appended claims when taken with the accompanying drawings.

DETAILED DESCRIPTION OF THE PREFERRED EMBODIMENT

A decorative article and a decorative laminate according to an embodiment of the present invention will now be described with reference to FIGS. 1 to 5(B).

Figure 3:
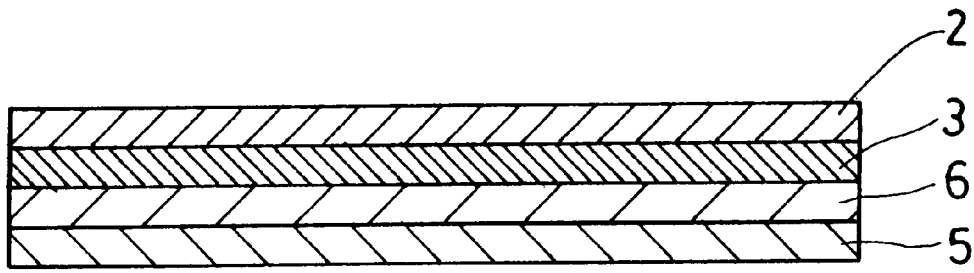
FIG. 3 is an enlarged sectional view of a decorative layer of the decorative laminate in which a coloring coating and a clear coating are not formed.
Figure 4:
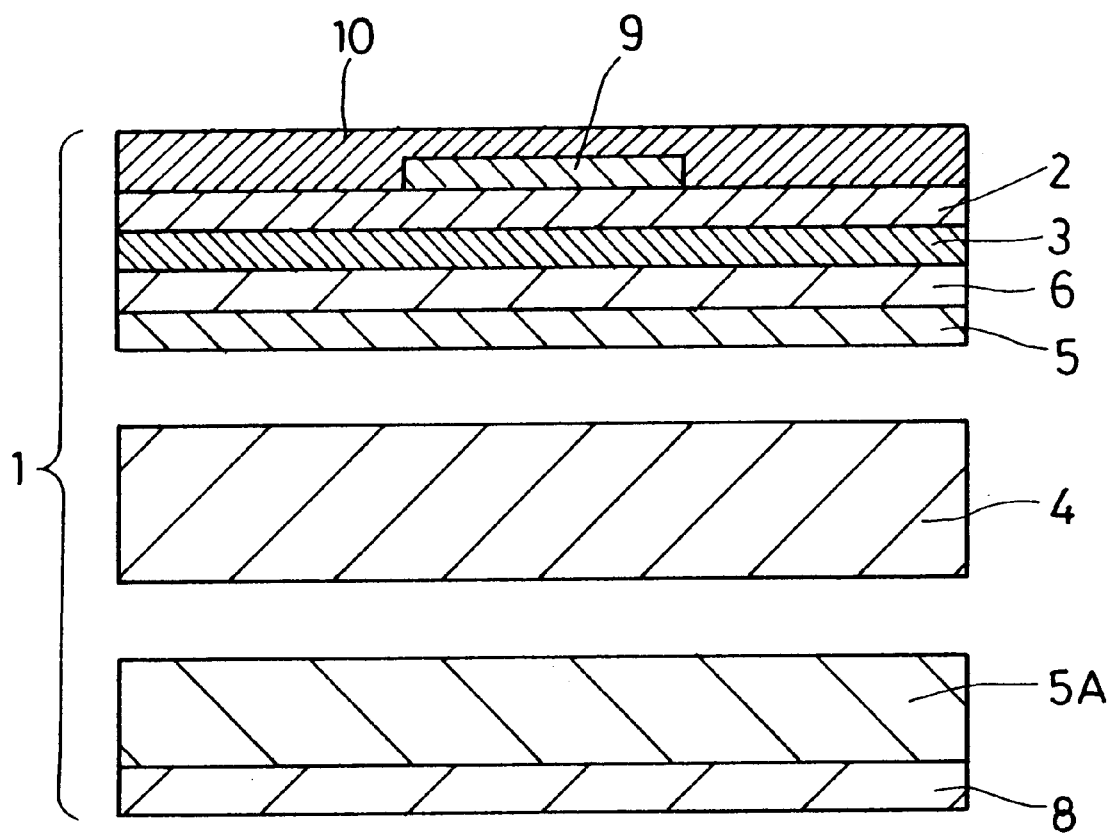
FIG. 4 is an enlarged sectional view of the decorative laminate in which the three layers are separated from each other.

Referring to FIGS. 3 and 4, shown therein and generally designated by the reference number 1 is the decorative laminate which comprises a base layer, an upper decorative layer and a lower adhesive layer.

The upper decorative layer comprises a resin film 2 having a glossy metal thin film 3 formed on the lower surface thereof, a protection coating 6 formed on the metal thin film 3, and an adhesive coating 5 applied on the protection coating 6. Additionally, the resin film 2 has a coloring coating 9 applied on the upper surface thereof for printing graphics thereon, and a clear coating 10 covering the upper surface of the resin film 2 and the coloring coating 9.

The resin film 2 can be a film made of thermoplastic synthetic resins such as polyethylene terephthalate, polyurethane, polyvinyl chloride, polypropylene and other such suitable materials. Preferably, the resin film 2 has a thickness of 12–100 micrometers.

The metal thin film 3 preferably is a thin film deposited by vacuum evaporating, sputtering, ion plating or other such processes. Although not shown in the drawings, the metal thin film 3 is formed in a microscopically discontinuous pattern. Preferably, a multi-dot pattern is utilized to form island structure. In other words, the metal thin film 3 is really a collection of many island-like or dot-like coating units, each unit covering a very small area. As will be appreciated, the multi-dot pattern of the metal thin film 3 is formed by cohesion of evaporated metal particles. Therefore, the metal thin film 3 is preferably formed by tin, indium and other similar metals which may exhibit excellent cohesive property. Further, the metal thin film 3 is formed while controlling the deposition rate of the metal, so as to have a visible light transmittance of about 8% to 17%.

The protection coating 6 functions to prevent oxidation of the metal thin film 3. However, the protection coating 6 may be omitted, if desired. Further, the adhesive coating 5 functions to combine the upper decorative layer with the base layer. Preferably, the adhesive coating 5 is a pressure-sensitive adhesive of acrylic resin, rubber and/or other resinous materials.

The coloring coating 9 preferably is a coating of printing ink from the acrylic resin family, the polyurethane resin family or another similar resin family. Such a coating may be formed by screen printing or other printing processes. However, the coloring coating 9 is not an essential element.

The clear coating 10 can be a coating of coating material selected from the acrylic resin family, the polyurethane resin family or other similar resin families. Such a coating preferably is formed by screen printing or other printing processes. As will be recognized, the selection of the coating material for the clear coating 10 depends on the environment in which the decorative laminate 1 is to be used. Again, the clear coating 10 also is not an essential element.

The base layer preferably is simply comprised of an elastic resin sheet 4 made of thermoplastic synthetic resins, for example, non-rigid polyvinyl chloride resins, polyurethane resins and thermoplastic elastomers. Preferably, the resin sheet 4 has a thickness of 200–2000 micrometers. As will be appreciated, the resin sheet 4 is adhered to the adhesive coating 5 of the upper decorative layer, so that the base layer is combined with the upper decorative layer.

The lower adhesive layer preferably is a double-sided tape 5A. The double-sided tape 5A essentially comprises a substrate sheet made of acrylic resin foam, polyurethane foam or nonwoven fabric, and the upper and lower adhesive coatings of acrylic resin, rubber and other resinous materials which are applied on the upper and lower surfaces of the substrate sheet, respectively. Preferably, the double-sided tape 5A has a thickness of 50–800 micrometers. As will be appreciated, the double sided tape 5A is adhered to the resin sheet 4 by the upper adhesive coating, so that the lower adhesive layer is combined with the base layer. Further, the double-sided tape 5A preferably includes a separator or release liner 8 provided on the lower adhesive coating so that the lower adhesive coating is protected.

Alternatively, the lower adhesive layer may be consist of an adhesive coating. In such a case, the adhesive coating is applied on the lower surface of the resin sheet 4 and is covered with the release liner 8.

Figure 1:
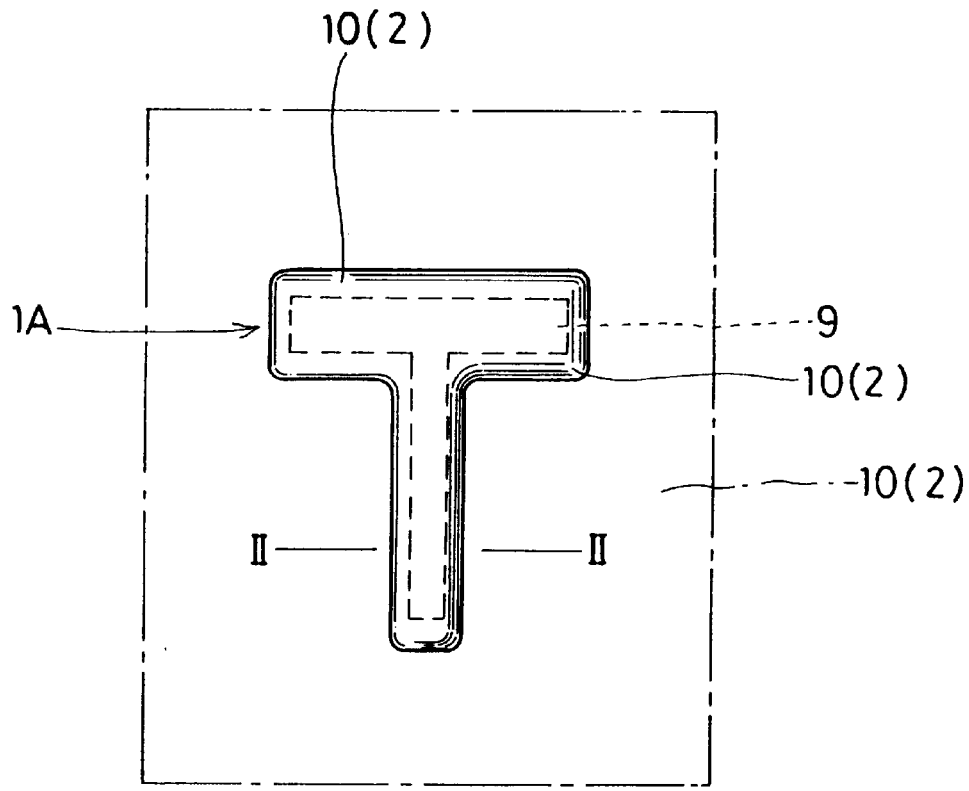
FIG. 1 is a plan view of a decorative article produced from a decorative laminate according to an embodiment of the present invention.
Figure 2:
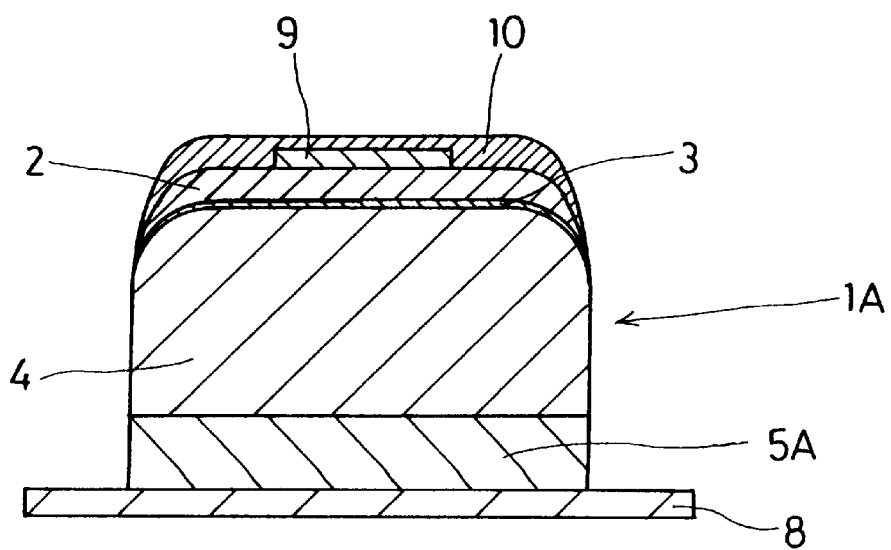
FIG. 2 is an enlarged sectional view taken along the line II—II of FIG. 1.

As shown in FIGS. 1 and 2, the decorative laminate 1 thus constructed is stamped to form a decorative article 1A such as an emblem of an automobile. As will be recognized, in FIG. 2, the adhesive coating 5 and the protection coating 6 are omitted for simplicity.

The decorative article 1A preferably is mounted on a mounting object such as an automobile body by adhesive force of the lower adhesive coating of the double-sided tape 5A.

Figure 5A:
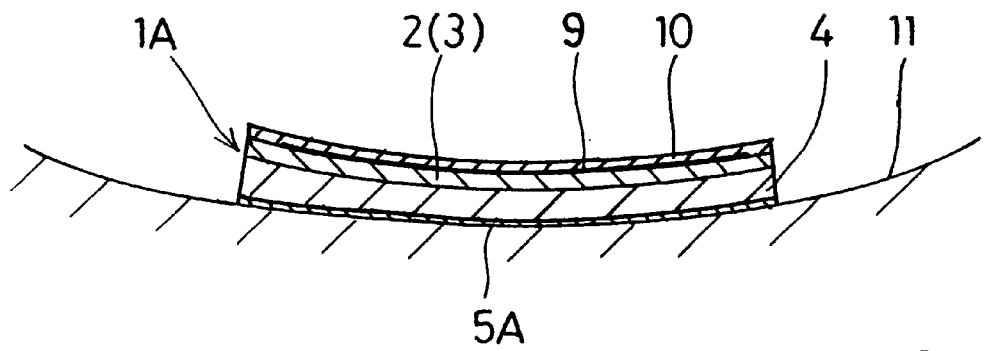
FIG. 5(A) is a sectional view of the decorative article mounted on a mounting object having a concave surface.
Figure 5B:
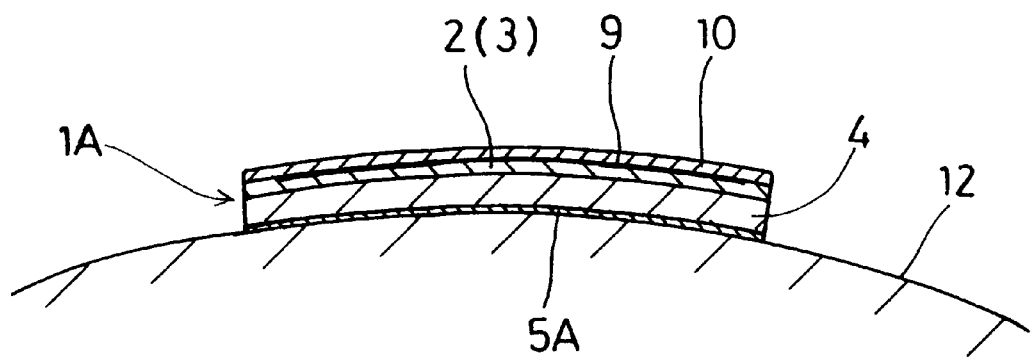
FIG. 5(B) is a sectional view of the decorative article mounted on a mounting object having a convex surface.

The decorative article 1A thus manufactured exhibits excellent elasticity. Therefore, the decorative article 1A can be suitably flexed to conform to the configuration and the curvature of the mounting object. Thus, as shown in FIGS. 5(A) and 5(B), the decorative article 1A can be mounted on different types of mounting objects 11 and 12 without injuring the appearance thereof.

The following examples are provided to further illustrate the present invention and should not be construed as limiting the invention.

EXAMPLE 1

A polyurethane film having a thickness of 40 micrometers was used as the resin film. The lower surface of the polyurethane film was covered by vacuum evaporator with a thin film of tin. The tin thin film was formed in the multi-dot pattern described above by controlling the deposition rate of tin. An acrylic pressure-sensitive adhesive material was then coated on the tin thin film to form the upper decorative layer. A non-rigid polyvinyl chloride resin sheet having a thickness of 1 mm was provided as the base layer and was bonded to the upper decorative layer. Further, a double-sided tape was provided as the lower adhesive layer. The double-sided tape consisted of an acrylic substrate sheet, upper and lower acrylic adhesive coatings, and a release liner provided on the lower acrylic adhesive coating. The double-sided tape was adhered to the rear surface of the non-rigid polyvinyl chloride resin sheet. Thus, the decorative laminate was formed.

Figure 6:
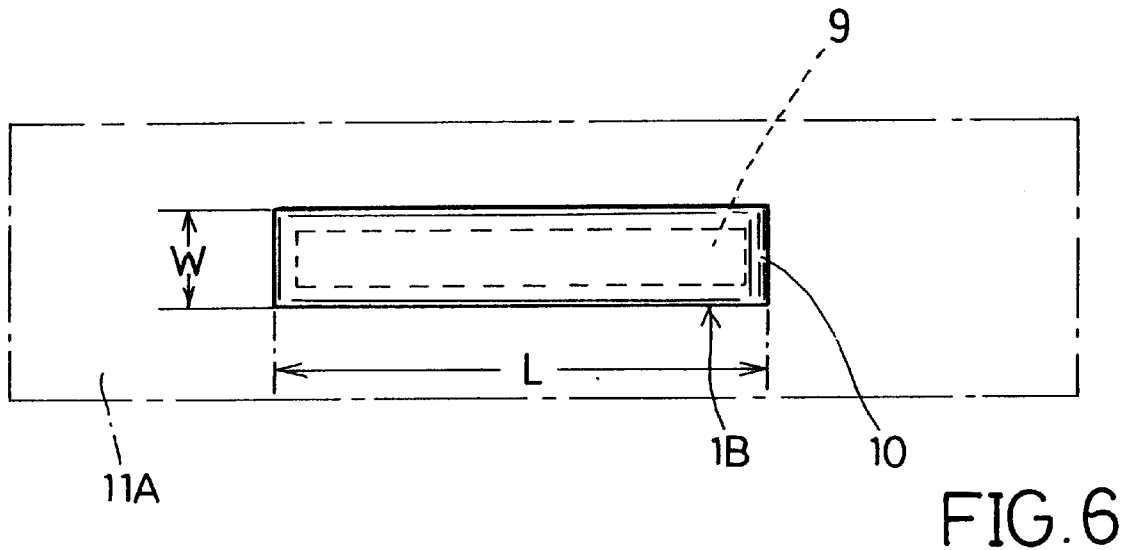
FIG. 6 is a plan view of a decorative article sample shown in the examples of the present invention.
Figure 7:
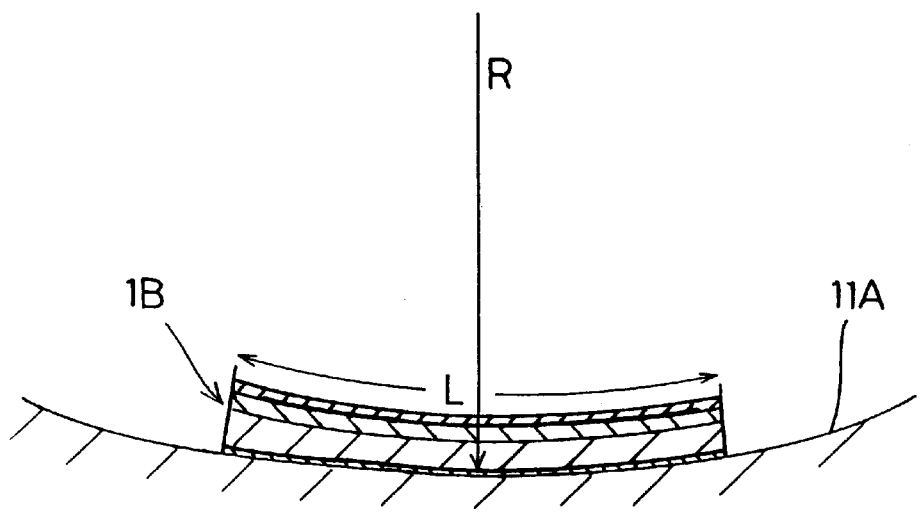
FIG. 7 is a sectional view of the decorative article sample mounted on the mounting object showing the test conditions described in the examples.

The decorative laminate thus formed was stamped to produce rectangular decorative article samples 1B shown in FIG. 6. Each sample 1B had a length L of 150 mm and a width W of 25 mm. As shown in FIG. 7, the samples 1B were mounted on mounting objects 11A having three different radius of curvature R (R=200, 100 and 50 mm), respectively.

EXAMPLE 2

A polyethylene terephthalate film having a thickness of 50 micrometers was used as the resin film. The lower surface of the polyethylene terephthalate film was covered with a tin thin film by vacuum evaporation. The tin thin film was also formed in the multi-dot pattern described above. An acrylic pressure-sensitive adhesive material was then coated on the tin thin film to form the upper decorative layer. A non-rigid polyvinyl chloride resin sheet having a thickness of 1 mm was provided as the base layer and was bonded to the upper decorative layer. Further, a double-sided tape described in Example 1 was used as the lower adhesive layer. The double-sided tape was adhered to the rear surface of the non-rigid polyvinyl chloride resin sheet to form the decorative laminate.

The decorative laminate thus formed was stamped to produce samples each having a length and a width same as those of the samples 1B described in Example 1. The samples were tested in a similar fashion as Example 1.

Conventional decorative article samples were prepared as Control 1. Each of these control samples consisted of an injection molded ABS substrate having a thickness of 3 mm, a chromium thin film formed on the upper surface of the substrate by plating, a clear coating applied on the chromium thin film by spray coating, and a double-sided tape adhered to the lower surface of the substrate. The double-sided tape was the same as that described in Example 1.

Each control sample was dimensioned to have a length and a width that was the same as those of samples 1B described in Example 1. The control samples were tested in a similar fashion as Example 1.

Additional conventional decorative article samples were prepared as Control 2. Each of these control samples consisted of an injection molded polyester elastomer substrate having a thickness of 3 mm, a base coating formed on the upper surface of the substrate by spray coating, a chromium-tin-copper alloy thin film formed on the base coating by vacuum evaporation, a clear coating applied on the alloy thin film by spray coating, and a double-sided tape provided on the lower surface of the substrate. The double-sided tape was the same as that described in Example 1.

Each control sample was prepared to have a length and a width that was the same as those dimensions of samples 1B described in Example 1. The control samples were tested in a similar fashion as Example 1.

Results of Examples 1 and 2 and Controls 1 and 2 are shown in Table I. For purposes of evaluation, the visual appearance of each sample was observed.

TABLE I

| | Radius of Curvature (R) | | |
|---|---|---|---|
| | 200 mm | 100 mm | 50 mm |
| Example 1 | Good | Good | Good |
| Example 2 | Good | Good | Good |
| Control 1 | Good | Poor | Poor |
| Control 2 | Good | Good | Poor |

As will be apparent from Table I, both of the samples of Examples 1 and 2 exhibited good appearance with regard to all of the mounting objects, whereas neither of the samples of Controls 1 and 2 exhibited good appearance with regard to the mounting object having radius of curvature of 50. This means that in each sample of Examples 1 and 2, the tin thin film was not damaged even when the sample was extremely flexed to conform to the profile of the mounting object having a small radius of curvature (i.e., large curvature). It is presumed that this is because the tin thin film was formed in a discontinuous or multi-dot pattern.

Thus, the decorative article of the present invention may be suitably adapted to various types of mounting objects having different curvature without changing the design thereof. Further, the decorative article may maintain a good appearance since the metal thin film is not damaged if the decorative article is extremely flexed. This advantage may lead to reduced manufacturing costs of decorative articles.

Further, in the decorative article of the present invention, progress of corrosion of the metal thin film may be effectively prevented or delayed, because the metal thin film is formed in a discontinuous or multi-dot pattern. Therefore, it is anticipated that the original appearance of the decorative article will be maintained for a long period of time.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A decorative article comprising:
   a base layer consisting essentially of an elastic resin sheet having a thickness of 200 to 2000 micrometers; and
   a decorative layer attached to said base layer and consisting essentially of a resin film and a metal film formed on a surface of said resin film disposed between said film and said base layer, the resin film having a thickness of 12 to 100 micrometers, said metal film being formed in a microscopically discontinuous pattern, in which the metal film consists essentially of island structures and has a visible light transmittance of about 8% to 17%.

2. A decorative article as defined in claim 1, wherein said microscopically discontinuous pattern is a multi-dot pattern.

3. A decorative article as defined in claim 1, wherein said metal film comprises tin or indium.

4. A decorative article as defined in claim 1, wherein said metal film is covered with a protection coating.

5. A decorative article as defined in claim 1, wherein said resin film is covered with a coloring coating.

6. A decorative article as defined in claim 1, wherein said resin film is covered with a clear coating.

7. A decorative article, comprising:
   a first layer comprising an elastic resin film having a thickness of 200 to 2000 micrometers; and
   a second layer proximally adhered to the first layer comprising a resin film and a metal film, the resin film having a thickness of 12 to 100 micrometers, the metal film being disposed on a surface of the resin film between the first layer and the second layer in a microscopically discontinuous pattern, consisting essentially of island structures and having a visible light transmittance of about 8% to 17%.

8. A decorative article as in claim 7 further comprising a third layer proximally adhered to the second layer comprising a protection coating.

9. A decorative article as in claim 8 further comprising a fourth layer proximally adhered to the third layer comprising an adhesive coating.

10. A decorative article as in claim 9 wherein the microscopically discontinuous pattern is a micro dot pattern.

11. A decorative article as in claim 10 further comprising a fifth layer proximally adhered to the first layer comprising a coloring coating.

12. A decorative article as in claim 11 further comprising a sixth layer proximally adhered to the fifth layer comprising a clear coating.

13. A decorative article as in claim 7 further comprising a third layer proximally adhered to the second layer comprising an elastic resin sheet.

14. A decorative article as in claim 7 wherein the metal film comprises tin or indium.

15. A decorative article as in claim 1 further comprising a lower adhesive layer attached to a side of the base layer that is opposite the decorative layer.

16. A decorative article as in claim 7 further comprising a third layer proximally adhered to the first layer opposite of the second layer, the third layer being an adhesive layer.

17. A decorative article as in claim 1 wherein the resin film is made from a thermoplastic synthetic resin.

18. A decorative article as in claim 17 wherein the thermoplastic synthetic resin is selected from the group consisting of polyethylene terephthalate, polyurethane, polyvinyl chloride and polypropylene.

19. A decorative article as in claim 7 wherein the resin film is made from a thermoplastic synthetic resin.

20. A decorative article as in claim 19 wherein the thermoplastic synthetic resin is selected from the group consisting of polyethylene terephthalate, polyurethane, polyvinyl chloride and polypropylene.

21. A decorative article as in claim 1 having sufficient elasticity and flexibility to be adaptable to be mounted to objects having different configurations and curvatures without alteration of a design formed by the metal film.

22. A decorative article as in claim 7 having sufficient elasticity and flexibility to be adaptable to be mounted to objects having different configurations and curvatures without alteration of a design formed by the metal film.

* * * * *